UNITED STATES PATENT OFFICE.

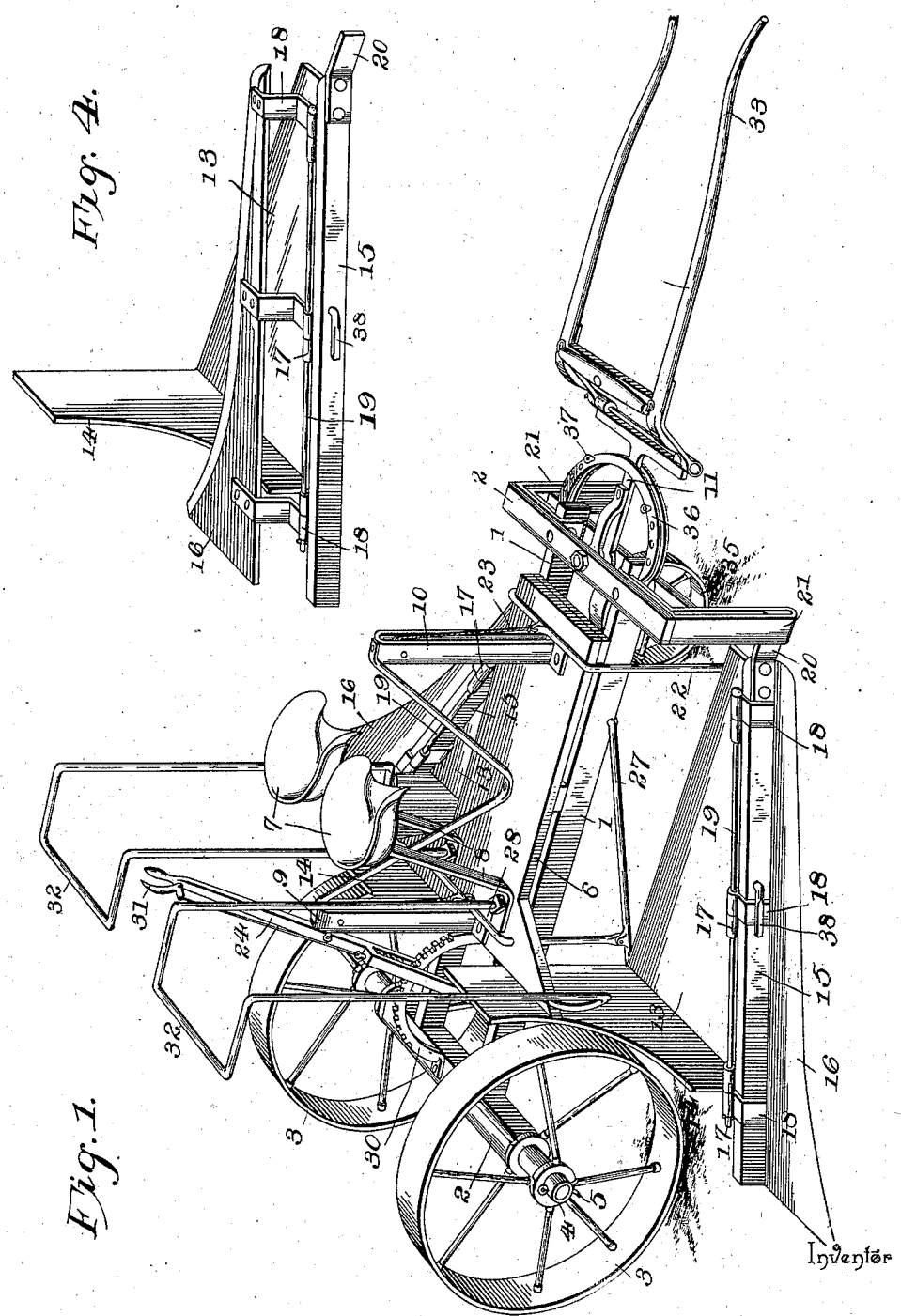

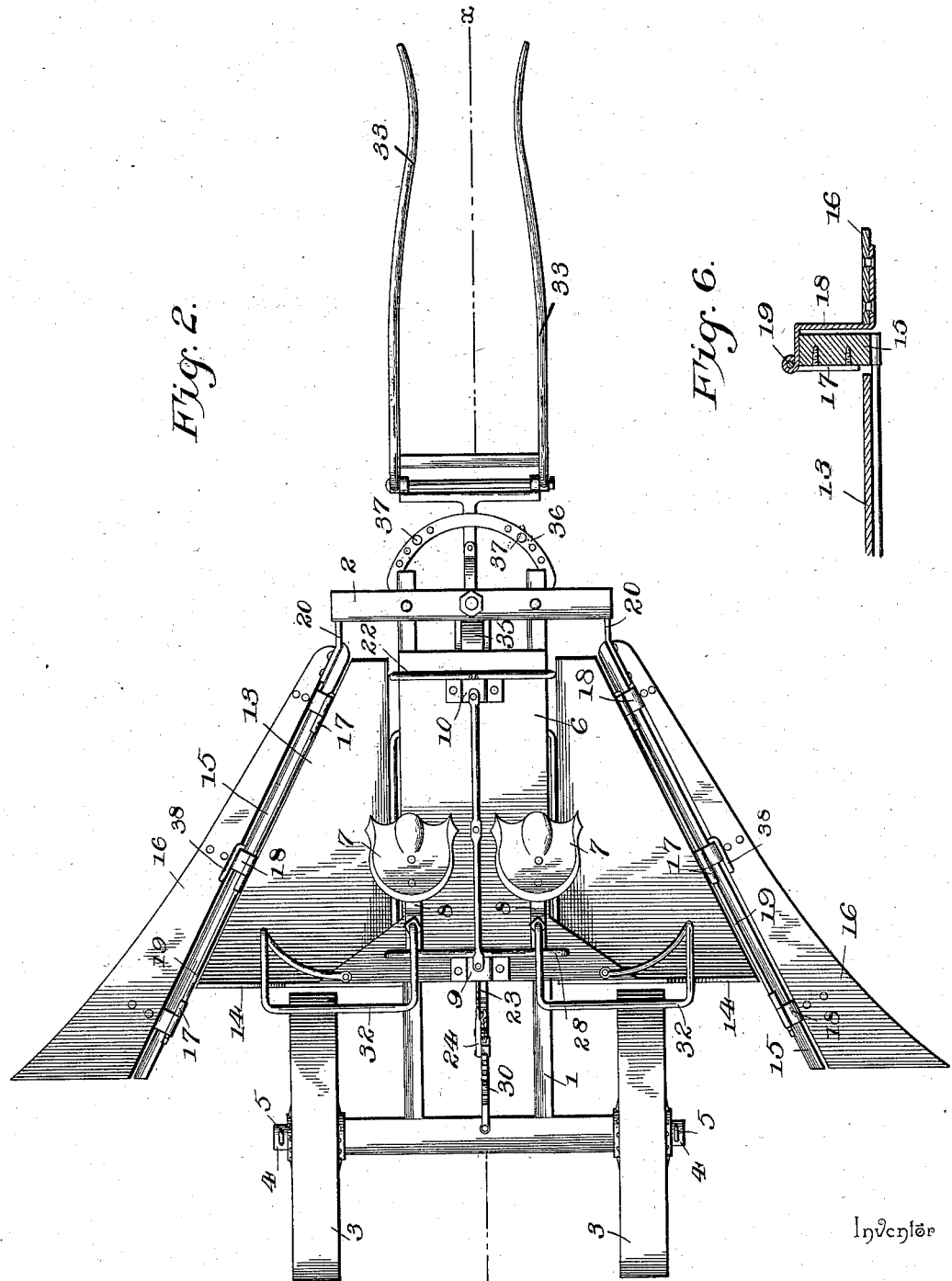

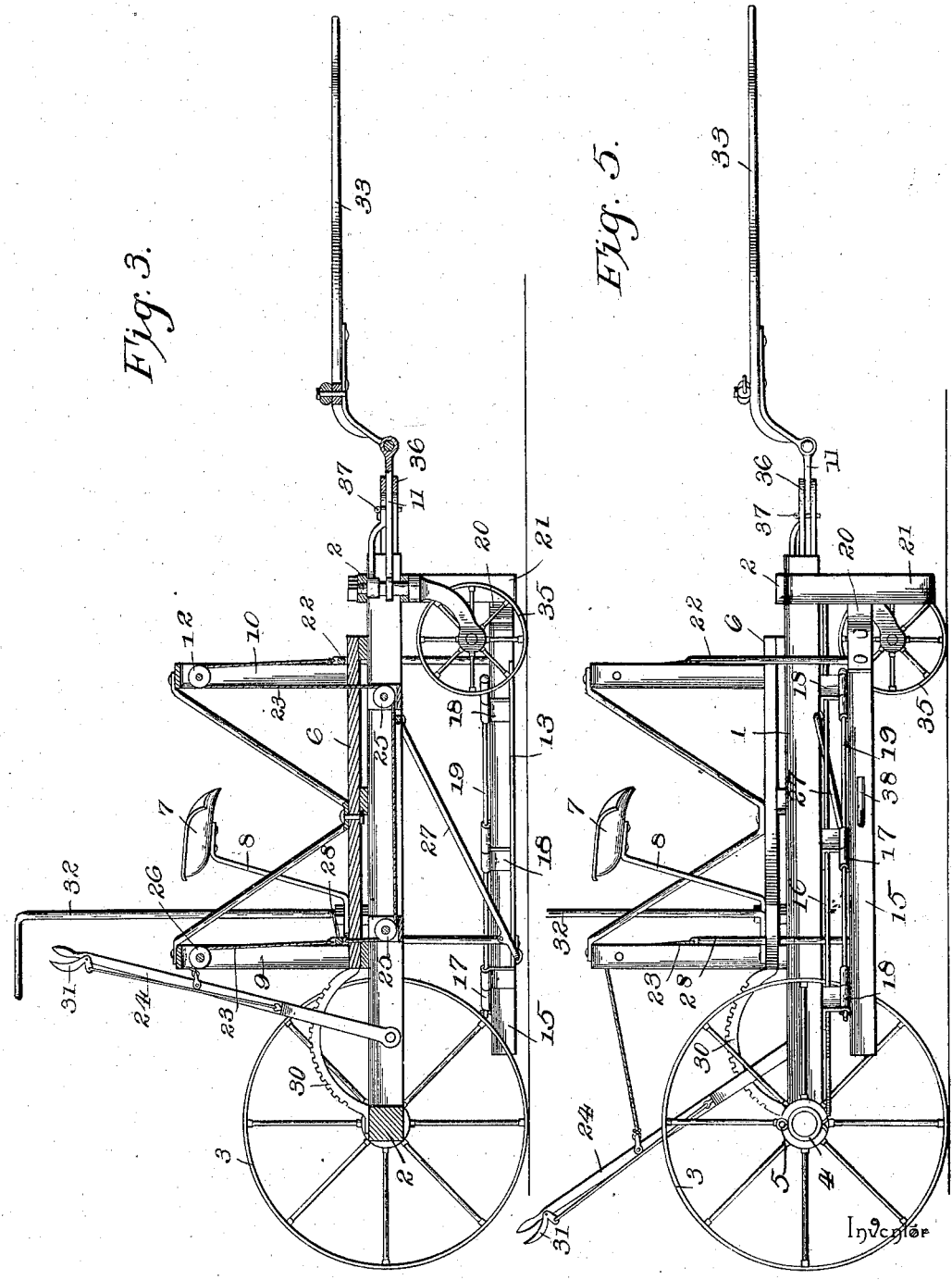

ALVIN W. ADDINGTON, OF CLARKS, INDIANA.

FODDER-HARVESTER.

SPECIFICATION forming part of Letters Patent No. 558,627, dated April 21, 1896.

Application filed March 29, 1895. Serial No. 543,738. (No model.)

*To all whom it may concern:*

Be it known that I, ALVIN W. ADDINGTON, a citizen of the United States, residing at Clarks, in the county of Randolph and State of Indiana, have invented a new and useful Fodder-Harvester, of which the following is a specification.

This invention relates to improved machinery for harvesting fodder and similar stalky growths, and has for its object to provide an implement for attaining the desired result in a rapid and satisfactory manner and which will admit of the cutting mechanism being raised and lowered to cut the stalks at the required distance from the ground, and which will further admit of the cutting-knives being folded so as to be thrown out of the way when not required for use, and which will be provided with means to prevent injurious contact of the team with the cutting-knives, all as will be more fully set forth hereinafter.

The improvement consists of the novel features and the peculiar construction and combination of the parts, which hereinafter will be more fully described and claimed, and which are shown in the accompanying drawings, in which—

Figure 1 is a perspective view showing the complete machine and as it will appear for cutting two rows of stalks at the same time. Fig. 2 is a top plan view of the machine. Fig. 3 is a longitudinal section on the line $x$ $x$ of Fig. 2. Fig. 4 is a detail view of a side platform, showing the manner of folding the knife attached thereto. Fig. 5 is a side elevation showing the platform and cutter elevated. Fig. 6 is a detail section showing the manner of providing the hinge-joint between the cutter and the platform.

The frame of the machine comprises longitudinal beams 1 and end beams 2. The end portions of the rear end beam are projected and rounded so as to provide spindles for the reception of the ground-wheels 3, which are held in place upon the spindles in any desired manner, preferably by metal bands 4 and keys 5, the latter passing through the bands and the outer end portion of the said spindles.
A platform 6 is mounted upon the longitudinal beams 1 and forms a support for the drivers' seats 7, whose standards 8 are secured to the said platform by single fastenings, whereby the said seats can be adjusted to suit the convenience of the drivers. U-shaped standards 9 and 10 project vertically from the platform 6 and have guide-pulleys 26 and 12 journaled in their respective upper ends to receive the cords or chains by means of which the platforms and cutters are raised and lowered.

Platforms 13 are disposed upon opposite sides of the frame and are of similar construction, being approximately triangular-shaped and having a rear portion which extends vertically to form fenders 14 to retain the fodder or stalks upon the platforms and from engagement with the ground-wheels 3. A side bar 15 is arranged at the outer inclined edge of each platform and forms a support for the cutter 16, which latter tapers from its front to its rear end and is connected to the said bar 15 by a hinge-joint, so as to fold upon and over the platform when it is required to throw the cutter out of operative relation.

There will be a series of hinge-joints between the cutter and the side bar, each being of like construction and comprising straps or irons 17 and 18. The part 17 is attached to the side bar 15, and the part 18 is secured to the cutter 16 and projects vertically and is bent at its upper end to extend over the top edge of the said bar. The opposing ends of the parts 17 and 18 form cuffs or sleeves, through which passes a rod 19, by means of which the pivotal or hinge joint is completed. This rod is headed at its front end to prevent displacement and is secured in place by a pin or key passing transversely through its rear end. A plate 20 projects from the front end of the bar 15 and is adapted to operate in a slotted hanger 21, pendent from the front end beam 2, so as to guide the platform in its vertical movements. It will be understood that there will be a slotted hanger 21 for each side of the machine, and that said hangers, in connection with the end beam, form an arch at the front end of the machine whose pendent portions 21 prevent lateral movement of the platforms 13, as will be readily understood.

An arch 22 extends over the platform 6, and its lower end portions are bent outward and form pivotal connection with the front ends of the platforms 13 and is connected by a cord or chain 23 with an operating-lever 24 near the rear end of the machine and within convenient reach of each driver's seat. This cord or chain 23 passes over the guide-pulley 12, thence through an opening in the platform 6, under guide-pulleys 25, beneath the platform 6, thence up through the platform, over a guide-pulley 26 to the operating-lever 24. A draft-arch 27 has pivotal connection with the longitudinal beams 1 and inclines downwardly and rearwardly and has its end portions bent outwardly and pivotally attached to the rear ends of the platforms 13. A third arch 28 extends over the platform 6 and has pivotal connection at its lower ends with the rearwardly-extending portions of the draft-arch 27 and is connected to the operating-lever 24 by means of the cord or chain 23, which has positive connection with the said arch 28, so as to elevate the latter simultaneously with the arch 22 on operating the lever 24 in the proper direction, thereby resulting in a vertical adjustment of the platforms 13 and the cutters 16 attached thereto. The operating-lever 24 is held in the adjusted position by a notched segment 30 and the ordinary hand-latch 31, as will be readily understood.

In order to prevent the toppling over of the fodder or stalks, holders 32 are provided, and consist of wire frames bent into substantially a rectangular shape and having the upper and lower cross-pieces rearwardly bowed so as to receive and hold the said fodder from lateral displacement. These holders are attached at their lower ends to the frame of the machine in any desired manner.

The pole or shafts 33 are attached by means of a draw-bar 11 to the vertical stem of the caster or pilot wheel 35, which is provided to support the front end of the machine. This draw-bar 11 operates between semicircular bars or plates 36 and is limited in its swinging movement by means of pins 37, passing through a set of registering openings in the said bars 36. By this means the lateral movements of the pole or shafts are limited, thereby preventing the horse or team from injurious contact with the cutters 16.

The operation of the machine is as follows: The appliance being drawn over the field, the corn, fodder, or other stalky growth is cut by means of the blades 16 and is received upon the platforms 13 until a sufficient quantity is gathered to form a bundle, which latter is tied and deposited upon the ground in the usual manner. The stalks when severed are caught by the driver and deposited upon the platform, and when it is required to operate upon only one row of stalks the cutter not required for use is thrown up out of the way. The cutter in operative position is held in place by means of a catch 38, which is turned to embrace that part of the hinge connected with the cutter, as will be readily understood.

In adapting the invention to the various styles of machines it is obvious that changes in the form, proportion, and the minor details of construction may be resorted to without departing from the principle or sacrificing any of the advantages of this invention.

Having thus described the invention, what is claimed as new is—

1. In a fodder or corn harvester, the combination with the main frame, of a side platform increasing in width from its front to the rear end, means for adjusting the said platform vertically, a fender attached to and carried by the rear end of the said platform and projecting vertically therefrom, and a cutter having pivotal connection with the outer edge of the platform and adapted to fold upon the latter, substantially as described for the purpose set forth.

2. In combination, a main frame, slotted hangers at the front end thereof, side platforms having forward extensions at their front ends to engage with the said slotted hangers, connections uniting the side platforms, provisions for raising and lowering the side platforms, and cutters having pivotal connection with the outer edges of the platforms and adapted to fold upon the latter, substantially as and for the purpose set forth.

3. In a fodder, or corn, harvester, the combination with side platforms, of arches supporting the said platforms, and an operating-lever operatively connected with the said arches, whereby the latter can be actuated to raise and lower the said platforms, substantially as described for the purpose set forth.

4. In combination, a frame supported upon ground-wheels and having standards rising vertically therefrom and slotted hangers pendent from its front end, side platforms having approximately a triangular shape and provided at their outer edges with side bars which have forward extensions to operate in the said slotted hangers, cutters having pivotal connection with the side bars, catches to hold the said cutters in operative relation, arches having their end portions bent outward and supporting the said platforms, cords, or chains, having connection with the said arches and passing over guide-pulleys in the said standards, and connected with an operating-lever, holders to retain the fodder upon the platforms in a standing position, and a pole, or shafts, limited in its side movements, substantially as and for the purpose described.

In testimony that I claim the foregoing as my own I have hereto affixed my signature in the presence of two witnesses.

ALVIN W. ADDINGTON.

Witnesses:
ANDREW ADAMS,
THOMAS H. CLARK.